US 6,710,799 B2

(12) United States Patent
Abnet et al.

(10) Patent No.: US 6,710,799 B2
(45) Date of Patent: Mar. 23, 2004

(54) MICROSCOPIC MOTION MEASURING

(75) Inventors: Cameron Abnet, Waltham, MA (US);
Daniel Feldkhun, Brighton, MA (US);
Abraham McAllister, Cambridge, MA
(US); Michael Mermelstein,
Cambridge, MA (US)

(73) Assignee: Umech Technologies, Watertown, MA (US)

( * ) Notice: Subject to any disclaimer, the term of this patent is extended or adjusted under 35 U.S.C. 154(b) by 536 days.

(21) Appl. No.: 09/750,886

(22) Filed: Dec. 28, 2000

(65) Prior Publication Data

US 2003/0218673 A1 Nov. 27, 2003

(51) Int. Cl.[7] .................................................. H04N 7/18
(52) U.S. Cl. ......................... 348/135; 348/79; 348/839
(58) Field of Search ......................... 348/135, 79, 839; H04N 7/18

(56) References Cited

U.S. PATENT DOCUMENTS

| | | | |
|---|---|---|---|
| 4,136,950 A | 1/1979 | Labrum et al. ................ 348/79 |
| 4,736,680 A | 4/1988 | Wales et al. ................ 101/491 |
| 4,835,616 A | 5/1989 | Morcom ..................... 348/317 |
| 4,893,922 A | 1/1990 | Eichweber ................. 348/140 |
| 4,913,547 A | 4/1990 | Moran ........................ 356/489 |
| 5,149,972 A | * 9/1992 | Fay et al. ................ 250/461.1 |
| 5,546,189 A | 8/1996 | Svetkoff et al. ............ 356/602 |
| 5,990,473 A | 11/1999 | Dickey et al. ............... 250/221 |
| 6,098,031 A | 8/2000 | Svetkoff et al. ............ 702/159 |
| 6,219,415 B1 | 4/2001 | Deutsch et al. | |
| 6,282,019 B1 | * 8/2001 | Kapitza ....................... 348/79 |

OTHER PUBLICATIONS

Horn, B and Schunk, B (1981), "Determining Optical Flow," Artificial Intelligence, 17:185–203.
Davis, C.Q. (1997), "Measuring Nanometer, Three–Dimensional Motions with Light Microscopy," Doctoral Thesis. Massachusetts Institute of Technology.
Abnet, C.C. (1998), "Measuring Mechanical Properties of the Isolated Tectorial Membrane Using a Magnetizable Bead," Doctoral Thesis. Massachuetts Institute of Technology.
Davis, C.Q. and Freeman, D.M. (1998), "Using a Light Microscope to Measure Motions with Nanometer Accuracy," Optical Engineering, 37(4): 1299–1304.
Hemmert, W., Mermelstein, M.S. and Freeman, D.M. (1999), "Nanometer Resolution of Three–Dimensional Motions Using Video Interference Microscopy." IEEE International MEMS99, Orlando, FL Jan. 17–21, 1999.
Nakano, K., et al., "Fringe Scanning Interferometric Imaging of Small Vibration Using Pulsed Laser Diode," T. Sice, vol. 31, No. 4, 454–460 (1995).

* cited by examiner

Primary Examiner—Howard Britton
(74) Attorney, Agent, or Firm—Fish & Richardson P.C.

(57) ABSTRACT

Microscopic motions of a target are measured by illuminating the target, receiving the image of the illuminated target, and controlling illumination with a computer. The real-time image of the illuminated target may be displayed.

32 Claims, 6 Drawing Sheets

MICROSCOPIC MOTION MEASURING

CROSS-REFERENCE TO RELATED APPLICATIONS

Not applicable.

STATEMENT REGARDING FEDERALLY SPONSORED RESEARCH OR DEVELOPMENT

Not applicable.

This invention relates to the field of microscopy, and in particular, to measuring motions of microscopic structures.

BACKGROUND OF THE INVENTION

There are many examples of microscopic structures with moving parts. A broad class of man-made structures is called micro-electromechanical systems (MEMS), which includes microelectro-optical systems (MOEMS). MEMS offer possibilities for the development of microscopic sensors, electro-optical components, and mechanical actuators. Often MEMS involve the motion of one or more parts. These motions can be as small as several nanometers and as fast as hundreds of megahertz.

Prior art methods for measurements of microscopic structures include laser vibrometers, white light interferometers, laser triangulation, video microscopy, and computer microvision.

The class of measurement systems that includes laser vibrometers provide high speed motion estimates. Laser vibrometers are typically capable of measuring motions of a reflective structure at one or a plurality of locations (for example an array of locations). Laser vibrometers typically project a spot of laser light on a target. A sensor measures changes in brightness due to interference between the projected light and light reflected by the target. Laser vibrometers can measure motions at hundreds of megahertz.

The class of measurement systems that includes white light interferometers (sometimes referred to as profilometers) typically measure variations in the height (out-of-plane) of structures. Structures with heights on the order of a nanometer can be measured.

The class of measurement systems that includes video microscopy typically measure both static and dynamic structures. Computer microvision refers to systems that combine an off-the-shelf light microscope, an off-the-shelf CCD camera, and stroboscopic illumination to capture images of small moving structures and machine vision algorithms to analyze those images. Small motions on the order of nanometers (much smaller than the resolution of the objective lens) can be resolved in three dimensions. Motions of almost any structure in the image can be measured. Measurable structures are structures that provide a spatial change in brightness or contrast that can be exploited by the machine vision algorithms.

A technique typically used by computer microvision systems is stroboscopic illumination. Stroboscopic illumination is a way of replacing a fast frame-rate camera with a fast and bright light source. Periodic motions, such as the vibrating tines of a tuning fork, are well suited to imaging using stroboscopic illumination. For example, a tuning fork may vibrate back and forth six thousand times a second. This is much faster than the frame rate of a video camera (30 frames/second). Under continuous lighting, the tines appear as a blur. However, a strobed light source can produce very short pulses of light that allow still frame images to be taken of the moving fork. Using a sequence of such images, the motion of the tuning fork can be reconstructed. The application of this technique to interferometry is particularly useful for out-of-plane motions.

It is known to use stroboscopic illumination to provide repeated illumination of a repetitive motion at the same position by light pulses synchronized with the motion and the duration of which is short relative to the speed of the motion desired to be captured. By this method, an image of a fast moving structure may be acquired by integrating the light reflected from numerous images of the structure in the same relative position. A sequence of images can be acquired in this manner such that a complete period of motion can be reconstructed. Previous implementations of stroboscopic illumination have used light pulse pairs to determine the size and velocity of a moving particle (Labrum, et al, U.S. Pat. No. 4,136,950). The motion of the particle and the strobe are not synchronous. However, a drive signal may be used to produce periodic motions of a microscopic structure while the illumination source is turned on and off in accordance with a trigger signal synchronous to the drive signal. As the structure moves, the phase of its motion repeats. An image of its position at any phase of its motion can be acquired by illuminating the structure at precisely the phase of interest. The duration of the pulse is short with respect to the speed of motion of the structure such that the resulting image is not blurred by the motion of the structure. A sequence of images acquired at different phases of motion can be used to represent a complete period of motion.

Machine vision algorithms represent a class of image processing algorithms. Given a time sequence of digitized images of a moving object, machine vision algorithms can be used to estimate the motion of the object. In particular, optical flow algorithms are a category of machine vision algorithms that have been used in previous computer microvision implementations.

Optical flow algorithms can be used to compare the spatial gradients in brightness within an image and the temporal gradients in brightness across a sequence of images. These variations in brightness are used to estimate motion. Other algorithms exist which use the brightness data across a sequence of images in a manner different from optical flow. For example, the centroid of brightness can be calculated, and its position can be compared across a sequence of images to estimate motion.

It is an important object of the invention to provide improved methods and means for measuring motion of microscopic structures.

BRIEF SUMMARY OF THE INVENTION

The invention, in one aspect, provides an integrated system and a method to measure motions (with up to six degrees of freedom) of microscopic structures, for example MEMS. In one embodiment, the apparatus comprises a computer server, an optics module, a video display for displaying images captured in real-time, an electronics module including a CCD camera, a mechanical mount and stage, and a custom software package including a Web-based user interface and algorithms for image analysis.

A CCD camera acquires images from the optics module. The electronics module transfers signals representative of these images to the server. The integration of a field programmable gate array (FPGA) architecture and the CCD camera provide useful visualization schemes, such as slow motion, in which selected phases of motion may be illuminated by a strobed light source, and images displayed. The result is to slow the apparent motion of the structure. For example, a structure moving at 100 kHz could be viewed such that the apparent motion was 1 Hz. Stop action video may also be provided by illuminating a single phase of motion by the strobed light source. Real-time video imagery may be acquired and displayed. The result is to stop the apparent motion of the structure.

In another aspect, the invention has an adjustable stage with up to six degrees of freedom, which may be controlled by the computer.

In yet another aspect, the invention has provision for a shuttered reference light path to be used to provide for interferometric measurements, which may be used to measure out-of-plane motions.

In still another aspect, the motion of the target may be controlled by a signal determined by the computer and produced by a field-programmable gate array. This signal may be synchronized with an external signal through the use of a phase-locked loop.

Multiple laser light sources may also be used to provide illumination (both brightfield and darkfield) and interferometric measurements at different wavelengths. Kohler illumination may also be used.

The computer may be controlled over a network. Network access to the system provides a number of advantages. A single instrument, centrally located, can be used remotely by a larger community of individuals than could use a typical instrument. Remote individuals access the same functionality as individuals manipulating the system directly. For these and similar reasons, the instrument is well suited to production environments such as clean rooms.

The details of one or more embodiments of the invention are set forth in the accompanying drawings and the description below. Other features and advantages of the invention will become apparent from the description, the drawings, and the claims.

DETAILED DESCRIPTION

Figure 1:
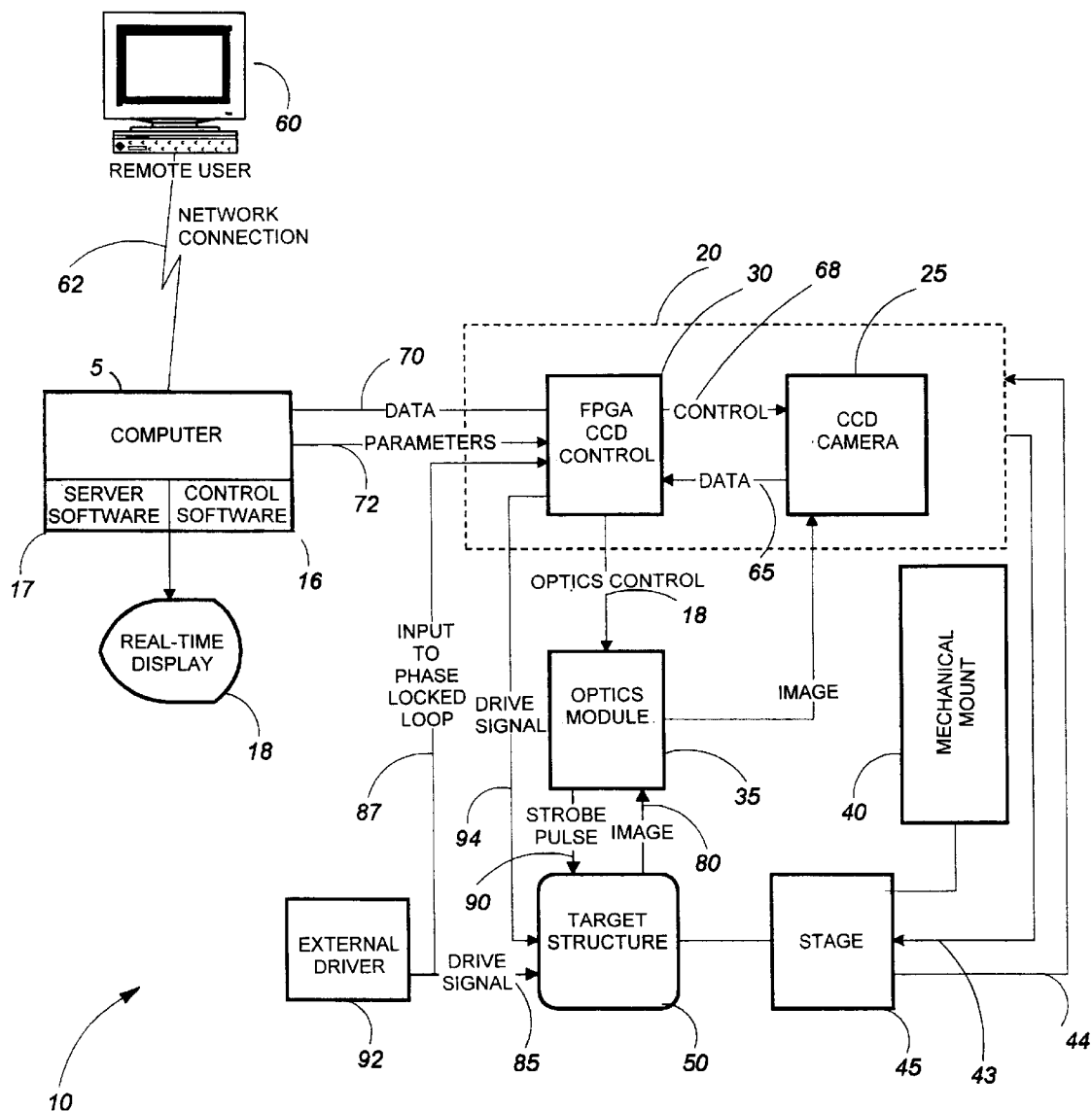
FIG. 1 is a block diagram of a system in accordance with the invention.

Referring to FIG. 1, a networked microscopic motion measurement system 10 according to the present invention is shown in a block diagram. It includes a computer 15, application control software 16 and server software 17, a display for real-time images 18, an electronics module 20 (electronics module 20 includes a CCD video camera 25 and control electronics 30), an optics module 35, a mechanical mount for CCD camera 25 and optics module 40, and a mechanical stage 45 for positioning of a target structure 50.

The specific computer used is not critical. The computer may be of a variety of configurations and operating systems. In one embodiment a 500 MHz Intel Pentium III microprocessor with 128 megabytes of RAM and a 4 gigabyte hard drive were used (not shown), running a Linux operating system and server software 17. Other operating systems, server software 17 and processors are suitable as well. In this embodiment three expansion cards were used, including a 100 MHz Ethernet card (not shown) for a network connection, a video display card (not shown), and an FPGA card (not shown) (Annapolis Microsystems Wild-One) is connected to the PCI bus. Other network cards, video cards and FPGA cards are suitable.

The server software 17 running on the computer 15 provides an interface layer between a web server and the hardware of the system 10. This permits a remote user at terminal 60 to operate the system 10 remotely over a network and to receive images. It also coordinates data storage and analysis. When the computer 15 is started, the control software causes a network socket to be opened, loads the firmware into the FPGA CCD control electronics 30, and starts the real-time display 18. In one embodiment, a Java applet may be run on the user's Web browser and interfaces with the server software over a network connection 62. The computer 15 may provide data taken by the system 10 to the real-time display 18 and/or stored on the hard drive for subsequent analysis, as well as to the remote user terminal 60 over network connection 62.

Figure 4:
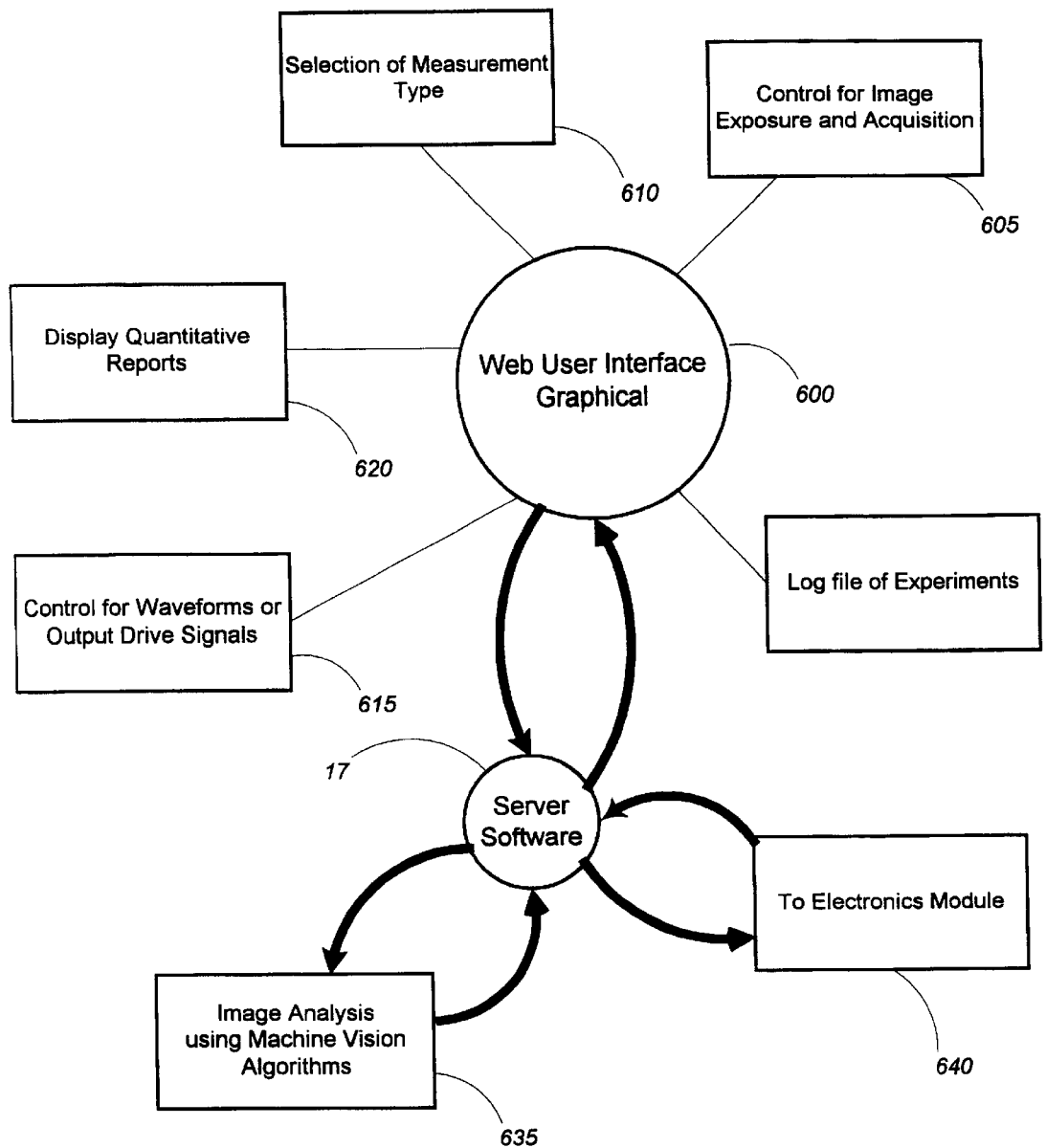
FIG. 4 is a functional diagram of an embodiment of software control applications in accordance with the invention; and Like reference symbols in the various drawings indicate like elements.

The control software 16 serves two functions. First, it provides a user interface for control of system parameters online 72 via the network connection 62. The user interface is a software application, for example a Java Applet, that allows the user to select various measurement types, to set parameters that control the image exposure, acquisition, and real-time display, to view quantitative reports and data summaries, to view summaries of past measurements, and to set the parameters of drive signals (waveforms). Selections and settings from the user interface are directed by the server software to other system components, for example, the electronics module. Second, the control software processes acquired image data signals and provides data visualization tools. In one embodiment, machine vision algorithms based on optical flow techniques provide motion measurements in six degrees of freedom. In addition, interferometric measurements are enabled. The control software 16 is capable of presenting processed image data signals in several ways, including as animation depicting the motion of the target structure. The data presentation is selectable via the user interface. The control software 16 automatically generates a log file recording the date, time, and type of measurement, including all parameters necessary to repeat the measurement. A schematic of the software is shown in FIG. 4.

Computer 10 provides parameters online 72 to control electronics 30, and receives data signals online 70 (including video information) from control electronics 30. In turn, control electronics 30 provides control signals 68 to CCD Camera 25, and receives video data signals online 65 from CCD Camera 25.

Control electronics 30 can provide a drive signal 94 to target structure 50, or a drive signal may be supplied from an external driver 92. If an external driver 92 is used, the drive signal online 85 may also be supplied to control electronics 30 as input to a phase-locked loop for illumination control. Signal online 87 may also be another external signal associated with the motion of the target. For example, a signal generated by a sensor that tracks some motion of the target.

Control electronics 30 provides optics control signals online 18 to an optics module 35, as described in more detail below. Optics module 35 receives an image signal online 80 from target structure 50 which is directed to CCD camera 25.

Figure 3:
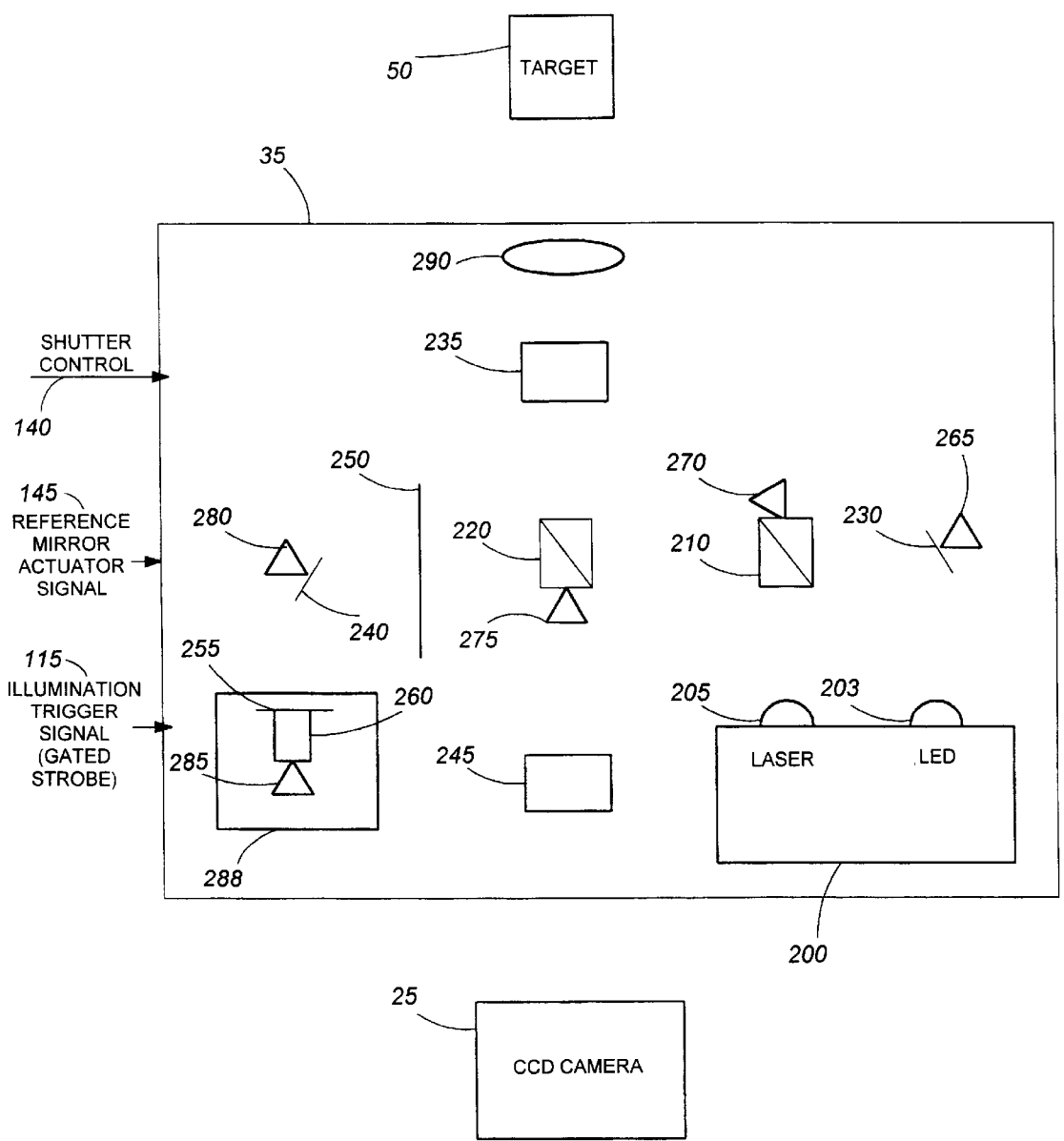
FIG. 3 is a schematic diagram of an embodiment of an optics module in accordance with the invention.

A mechanical mount 40 rigidly supports optics module 35 and CCD camera 25 in relative position, and positions optics module 35 relative to both CCD camera 25 and the target structure 50. An adjustable stage 45 allows positioning a target structure 50 in the field of view of the objective 290, as shown in FIG. 3. Stage 45 can be adjusted with up to six degrees of freedom (three translation axes and three rotation axes). In one embodiment, the stage is controlled via mechanical actuators, such as servo motors (not shown). The motors receive control signals online 43 from electronics module 20. The position of the stage may be measured with position sensors, such as capacitive or optical sensors, whose signals are fed back online 44 to electronics module 20. The stage can be independent of or integrated with production line equipment such as semiconductor wafer handling equipment.

Figure 2:
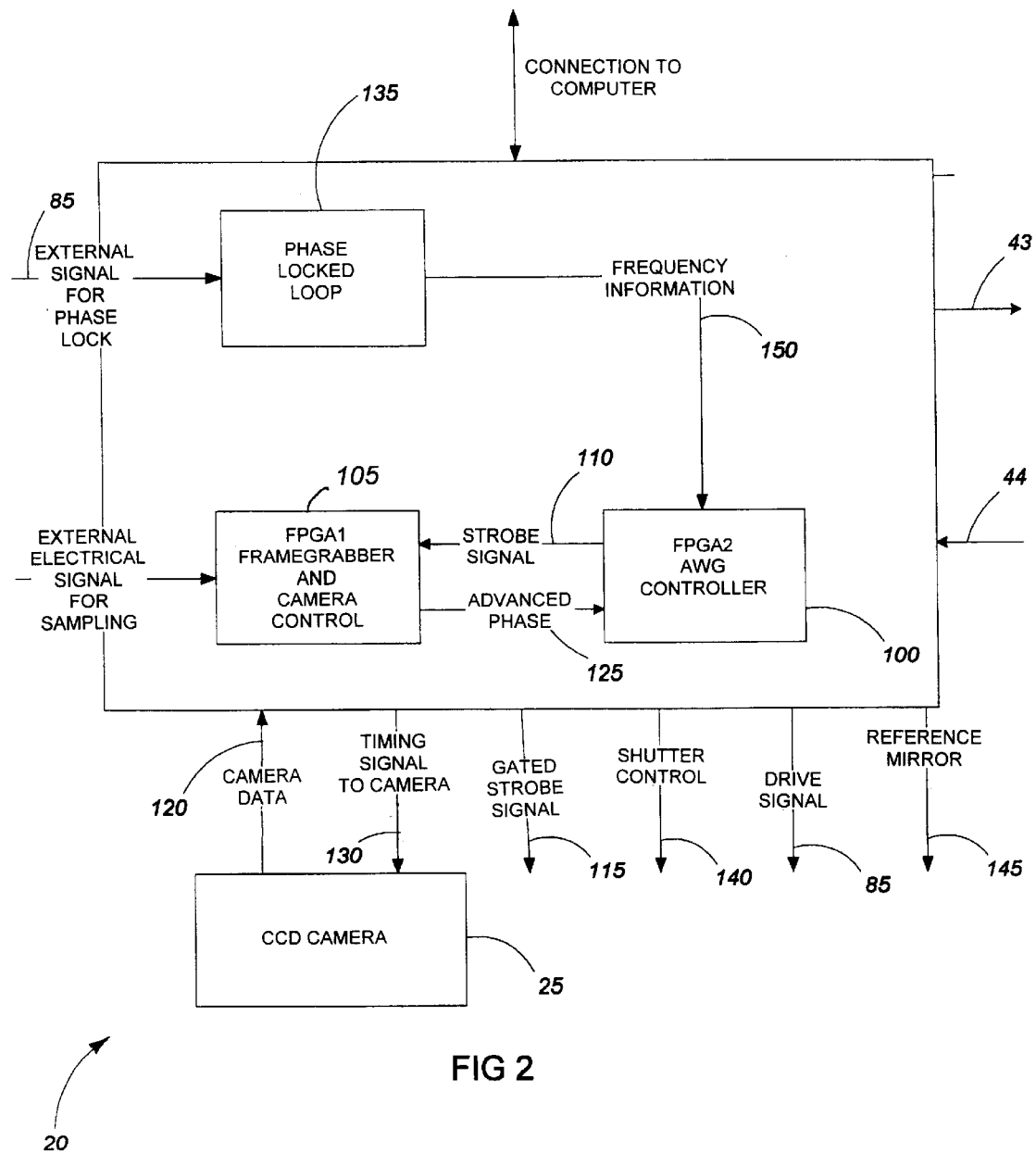
FIG. 2 is a block diagram of an embodiment of an electronics module in accordance with the invention.

Referring to FIG. 2, an electronics module 20 according to the present invention is shown. In one implementation, the electronics module is assembled from any of a variety of commercially available peripheral cards installed in computer 10, such cards having at least two FPGAs (such as the Annapolis Microsystems Wild-One™ card). The FPGAs are programmed via firmware to perform several functions. One FPGA, FPGA2 100, is dedicated to waveform or drive signal generation. This function is referred to as the arbitrary waveform generator (AWG). The waveform is defined by the user via software. In addition, FPGA2 100 is the source of other signals not involving camera control. The other FPGA, FPGA1 105, is dedicated to camera control. Two daughter boards (not shown) are connected to FPGA 2 card 100 and provide, in this case, two arbitrary waveform channels. The daughter boards may be connected to a stacking bus (not shown) that allows the addition of up to 15 AWG channels.

Prior to a measurement, information required to produce a waveform (or drive signal 94) is loaded from the server, as are measurement settings such as the exposure time. During a measurement, FPGA2 100 (functioning as an AWG) outputs a drive signal 94 for a MEMS structure and a synchronous strobe trigger signal online 110. The strobe trigger signal online 110 is sent to FPGA1 105 and gated by FPGA1 105. The gated signal online 115 turns on the illumination only while CCD camera 25 is acquiring an image (expose state). When the exposure is complete, the camera data signal online 120 is read out from CCD camera 25. Acquired image signals are sent to the server, where they are stored for analysis or displayed. A signal online 125 is sent by FPGA2 100 to advance the strobe signal online 115 to the next phase. The image corresponding to the next desired phase of motion may then be acquired by CCD camera 25. The timing signals online 130 required to control camera exposure and readout are sent by FPGA1 105.

In addition to sampling images of a structure's motion, an external electrical signal online 85 (not originating in the system) associated with the structure to be measured (target 50) can be simultaneously sampled by the electronics module. Also, the external signal online 85 can be input to a phase-locked loop 135 in electronics module 20 which can phase lock to the signal frequency. This allows FPGA2 100 acting as an AWG controller to generate waveforms and a strobe trigger signal online 115 synchronous with the external drive signal online 85.

Electronics module 20 provides a signal for control of a shutter 140 as described below in the optics module 35, as well as the voltage signal for the reference mirror actuator online 145.

Referring to FIG. 3, an optics module 35 is shown according to the present invention. Optics module 35 includes an illumination module 200, two beamsplitters 210 and 220, four right-angle-mirrors 230, 235, 240 and 245, a shutter 250 that is actuated by a solenoid (not shown), shutter control circuitry (not shown), a reference mirror 255 attached to a piezoelectric actuator 260, five mounts with adjustable tip and tilt 265, 270, 275, 280 and 285, and one single axis translation stage 288. The layout of components shown in FIG. 3 provides a compact design.

In one embodiment, the illumination module 200 mounts two light sources, including an LED 203 and a laser diode 205. In one embodiment, the LED 203 produces a 470 nm blue light while the laser diode 205 produces a 635 nm red light. Other illumination sources may be used. The common optical path 415 for both illumination sources includes, the right-angle-mirror 230, beamsplitter 210, right-angle-mirror 235, an objective lens 290, right-angle-mirror 245, and CCD camera 25. In addition, there is a reference path for interferometry that includes beamsplitter 220, shutter 250, right-angle-mirror 240, and reference mirror 255. The light paths are described in more detail below.

Figure 3A:
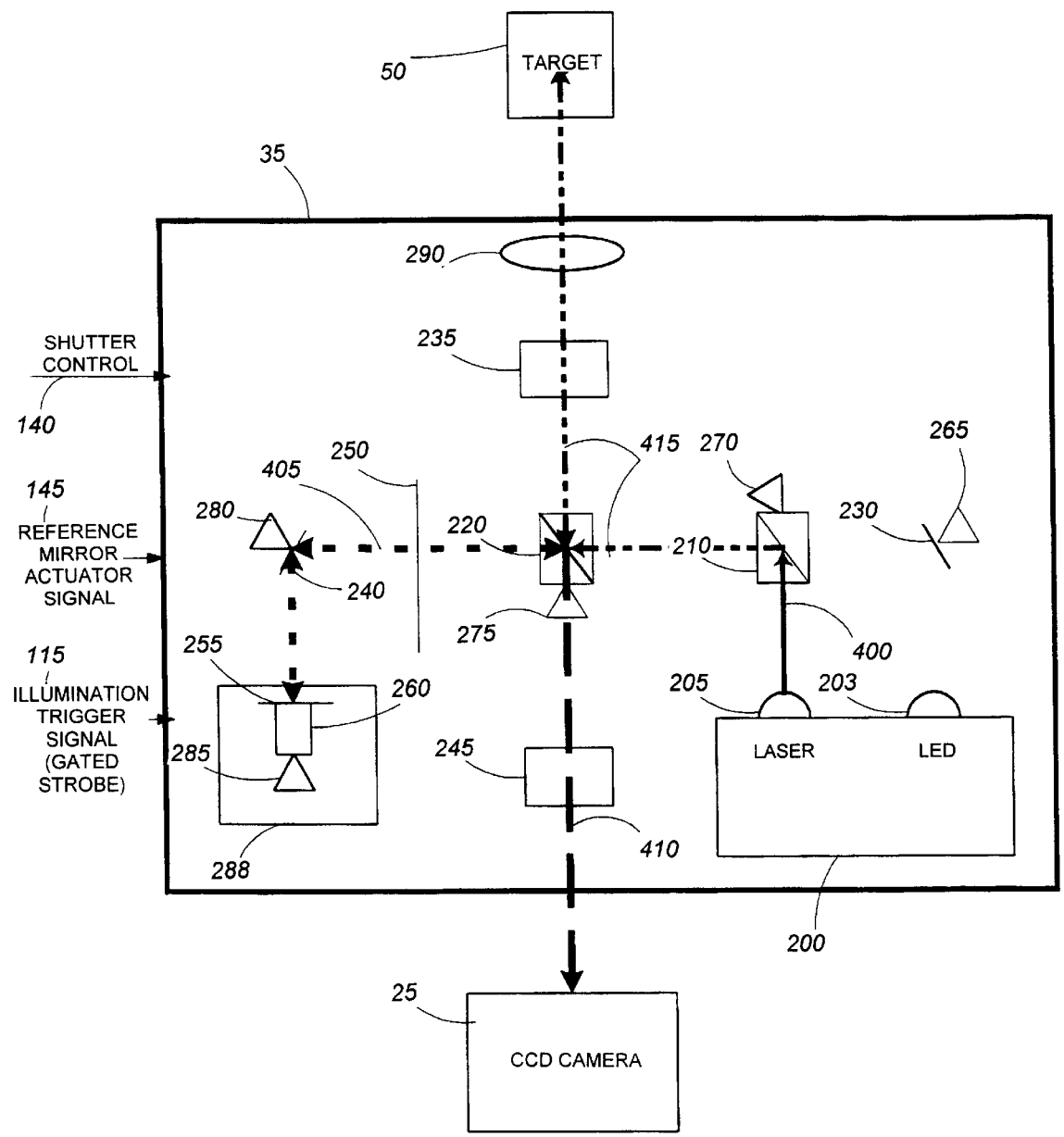
FIG. 3A is a schematic diagram of an embodiment of an optics module in accordance with the invention showing the optical paths during laser interferometry.

Referring to FIG. 3A, light paths for interferometric measurements are shown. Using the laser light source 205, light travels on the laser illumination path 400 and is reflected off beamsplitter 210, along the common illumination path 415 to beamsplitter 220 and further along the common illumination path 415 off right angle mirror 235, objective 290 and thus illuminates target 50. Reflected light from the target travels back along illumination path 415 through the objective lens 290, reflected off right angle mirror 235 and back to beamsplitter 220.

A portion of the light hitting beamsplitter 220 from laser 205 along illumination path 400 and the common illumination path 415 is passed along reference path 405 through beamsplitter 220 and shutter 250 (which is in the open position) and is reflected off right angle mirror 240, and onto reference mirror 255. This light is reflected back along reference path 405 and re-combines with the light from the illuminated target 50 at beamsplitter 220, where the combined light is sent to right angle mirror 245 along light path 410 to the CCD camera.

Differences in the height (distance along the optical axis) of locations on the target, change the length of the light path to and from the target relative to the reference path 405. When projected onto the sensor of the CCD camera 25, these differences produce an interferogram, or areas of bright and dark (fringes) in the image corresponding to differences in height.

The piezoelectric actuator 260 is used to move the reference mirror 255, thereby changing the length of reference path 405. By changing the length of reference path 405, the generated fringes change in the image. A sequence of images with different actuator positions allows an unambiguous determination of motion along the optical axis.

Figure 3B:
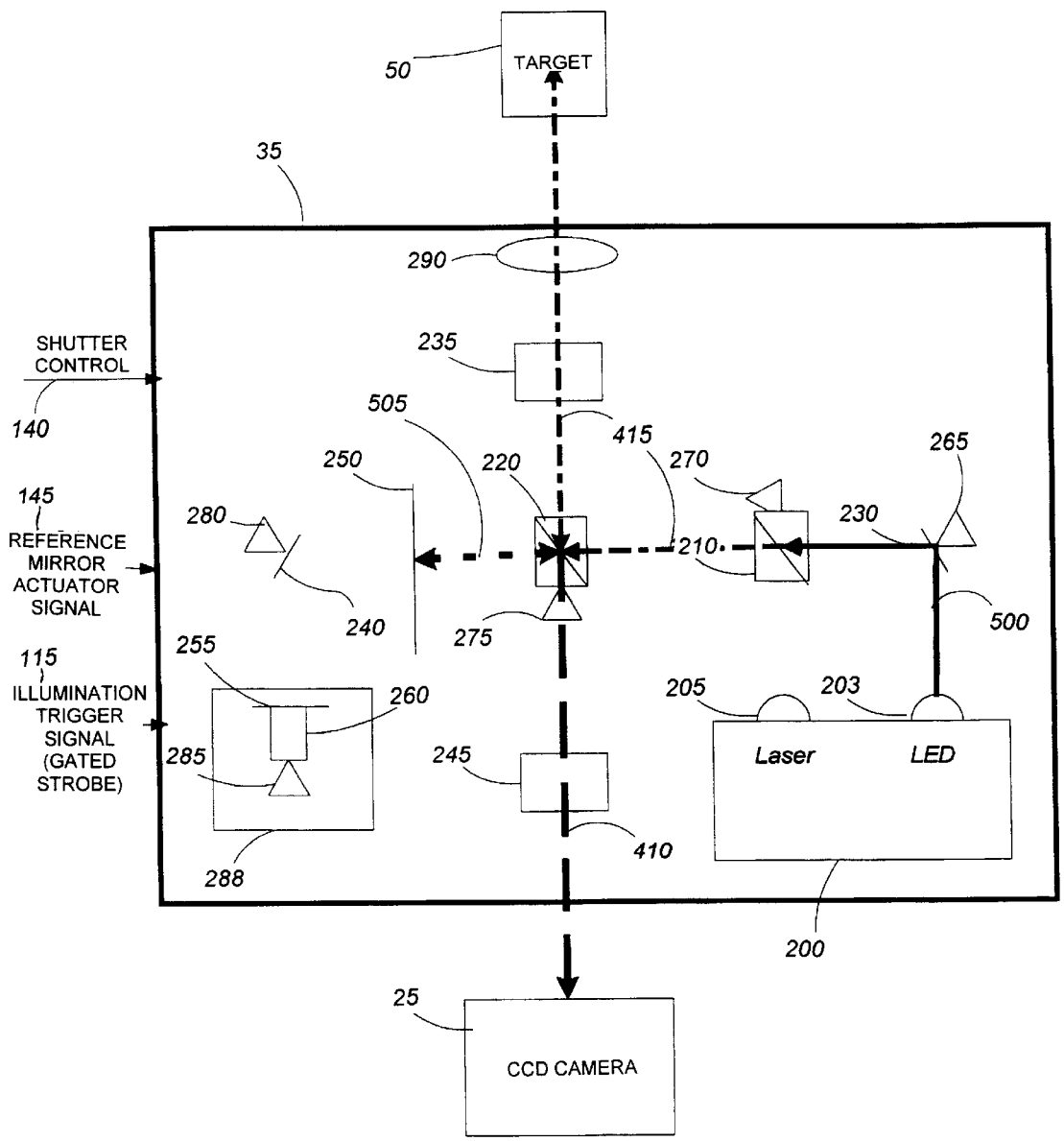
FIG. 3B is a schematic diagram of an embodiment of an optics module in accordance with the invention showing the optical paths during LED illumination without interferometry.

Refer to FIG. 3b for brightfield measurements, shutter 250 blocks the reference path (closed position). Light from LED 203 travels along illumination path 500 and is reflected from the right-angle-mirror 230 to beamsplitter 210. Beamsplitter 210 transmits a portion of the light along common illumination path 415 to beamsplitter 220 and then to the right-angle-mirror 235 and down through objective lens 290 which projects the light onto the target 50. Light reflected from the target returns along common illumination path 415 and passes back through the objective 290. The light is then reflected by right-angle-mirror 235 causing it to pass through beamsplitter 220. After passing through beamsplitter 220, the light travels along path 410 and is reflected by right-angle mirror 245, forming an image on CCD camera 25.

Stroboscopic illumination may be used to provide apparent motion stopping or to view repetitive movement at selected phases. Gated strobe trigger signal online 115 is provided by electronics module 20. The gated strobe signal online 115 is synchronous with the drive signal online 94, which can be phase locked to an external signal 85 or set to a specific frequency using control software 16.

Alignment of components in the optics module 35 is desirable for obtaining images suitable for visualization and motion measurements. Alignment of the illumination to the optical path is achieved at several locations. Four adjustment screws (two for each light source 203 and 205), allow alignment of the direction of the light emitted by each light source 203 and 205. Alignment of beamsplitter 210 and 220, right-angle-mirrors 230 and 240 and reference mirror 255 may be accomplished with tip-tilt stages 270, 275, 265, 280 and 285 respectively.

Mounting of optics module 35 and CCD camera 25 provide adjustment of the vertical distance relative to one another and relative to target 50. Adjustment of the target 50 position is achieved via a mechanical stage that provides both manual and electronic control of six axes (3 rotation, 3 translation). Control signals for the mechanical stage are generated by the electronics module. The position of the stage is determined by displacement sensors that provide a signal to the electronics module.

In one embodiment, the illumination sources 203 and 205 receive a signal online 115 from electronics module 20 that controls intensity of the illumination, the duration the illumination is on, and the time the illumination turns on relative to another signal produced by the MEMS structure or the electronics module. In one embodiment, this signal is the drive signal or waveform provided by or to the target. Optics module 35 provides illumination sources for more than one type of illumination. The illumination source can be selected by the user. In one embodiment, the illumination source is either a light-emitting diode (LED) 203 or a laser 205. LED 203 is used for brightfield images of a structure, and laser 205 is used for full-field interferometric measurements of a structure. A common optical path, including objective lens 290, is used to transmit the light from the illumination source 203 or 205 to the structure. The optical path can be used for Kohler illumination (a type of brightfield illumination) and for interferometry. Kohler illumination is a technique that provides a spatially uniform illumination of the target from a spatially non-uniform illumination source. Use of a common optical path eases the task of alignment of the system. In addition, optics module 35 includes the reference leg for interferometric measurements. In one embodiment, light is sent to the reference leg through shutter 250. Shutter 250 is controlled via an electrical signal online 140 from the electronics module. Brightfield images can be improved by closing shutter 250 and eliminating the reference leg.

A real-time video display 18 provides for qualitative analysis of a periodic moving structure. Each phase of motion captured by CCD camera 35 may be displayed on video display 18. The resulting sequence of images slows the apparent motion of the target structure 50. The user can see new details of the motion, such as, by way of a non-limiting example, how motions propagate along or through a structure. Combined with the phase-locked loop and an external drive signal, a user can sweep through a range of frequencies looking for drive frequencies that produce interesting apparent motions of the structure, such as a resonance. This is a valuable visualization tool for demonstration or preparation for more thorough quantitative measurements.

Referring to FIG. 4, an embodiment of the software according to the present invention 16 is shown in a functional diagram. The software 16 may be implemented with other features than those described below. For example, in the embodiment shown, the software includes a central web user interface and graphical interface 600. The interface 600 provides access to modules such as control for image exposure and acquisition 605, selection of measurement types 610, display, design and control of waveforms for output drive signals 615 to the target 50, creation of logs of experiments performed 625, and display of quantitative reports 620.

The web user interface 600 may communicate with the software 17, to provide control signals 640 to the electronics module 20 and to perform image analysis using desired machine vision algorithms.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular embodiments. It will be understood that various modifications may be made without departing from the spirit and scope of the invention. For example, optical components suitable for the integrated, full-field microscopic motion measurement can take many forms. The relative position and orientation of components can be changed while maintaining the capability for both brightfield and interferometric imaging. Custom optics that reduce the number of individual components or replace individual components can be designed and implemented. Different illumination sources can be used for both the brightfield and interferometric illumination. These sources can include changes in the monochromatic wavelength of radiation or the spectrum of radiation for non-monochromatic light. Stroboscopic illumination can be achieved by a number of means, including mechanical and electronic shutters.

The mechanical stage and target could be part of or controlled by an automated handling system. In this way, the probe station would act as an inline test station for production line device measurement and characterization.

The target is not limited to MEMS. Targets can include any viewable moving object. Objects can include man-made or natural structures. Optical systems capable of accommodating larger structures can be built. These systems may allow imaging of large moving objects such as people or vehicles. In addition, the target is not limited to fast moving objects. Slow moving structures may be measured as well as periodic and a periodic motions. For example, a time lapse sequence of images or a sequence of measurements separated by a duration much longer than the period of motion.

The present system is well suited to the measurement of microscopic motions. By way of an example, a microscopic motion could be smaller than or on the order of the wavelength of the illumination. By way of another example, a microscopic motion could be smaller than or on the order of the point spread function or pixel size of the imaging system. By way of another example, a microscopic motion could be smaller than the resolution of the human eye. In addition, the system is also well suited to the measurement of target motions larger than microscopic motions.

Machine vision algorithms based on principles other than optical flow can be implemented. For example, block matching or cross-correlation techniques may be used.

Other embodiments are within the scope of the following claims.

What is claimed is:

1. A system for measurement of microscopic motions of a target comprising:
   an optics module having at least one illumination source for illuminating the target;
   an electronics module having electronic circuitry constructed and arranged to control the at least one illumination source;
   a video camera constructed and arranged to receive imagery of the target when illuminated by the illumination source;
   a computer having software constructed and arranged to provide control signals to the electronics module;
   and a real time video display constructed and arranged to display imagery in response to signals from said video camera.

2. The system of claim 1 further comprising an adjustable stage to support the target, the position of the stage being controllable by the computer.

3. The system of claim 2 wherein the electronics module further comprises electronic circuitry constructed and arranged to provide at least one control signal to the adjustable stage.

4. The system of claim 3 wherein the stage is adjustable in three rotational planes and three translational planes.

5. The system of claim 1 wherein the optics module further comprises a reference path.

6. The system of claim 5 wherein the reference path comprises a shutter which may be open or shut under control of control signals from the electronics module.

7. The system of claim 1 wherein the at least one illumination source may be gated on and off stroboscopically.

8. The system of claim 7 wherein the timing of the stroboscopic illumination is controlled by the computer.

9. The system of claim 7 wherein the electronics module further comprises,
   a phase-locked loop constructed and arranged to receive a signal from an external source and provide a control signal to at least one illumination source to gate the at least one illumination source on and off stroboscopically in synchronization with the external signal.

10. The system of claim 1 further comprising a second illumination source with a portion of an optical path in common with the at least one illumination source.

11. The system of claim 1 wherein the computer is controllable over a network.

12. The system of claim 1 further comprising field programmable gate arrays constructed and arranged to provide at least one programmable waveform channel which may be provided to drive a target.

13. The system of claim 1 wherein the position of the optics module is adjustable in three rotational planes and three translational planes.

14. The system of claim 2 comprising a phase-locked loop which may be synchronized with an external signal and locked with the at least one programmable waveform channel.

15. A method of using the system of claim 7 comprising stroboscopically illuminating the target and displaying real time imagery of the stroboscopically illuminated target.

16. The system of claim 7 further comprising at least two illumination sources each of which may be gated stroboscopically.

17. The system of claim 1 in which the illumination is Kohler illumination.

18. A method of measuring microscopic motions of a target comprising:
   illuminating the target with at least one illumination source,
   receiving an image of the illuminated target with a video camera,
   controlling the at least one illumination source with a computer,
   and displaying real-time video imagery of the target illuminated by the at least one illumination source.

19. The method of claim 18 and further comprising supporting the target with an adjustable stage,
   and controlling the position of the stage with the computer.

20. The method of claim 19 wherein controlling the position of the stage may occur in three rotational planes and three translational planes.

21. The method of claim 18 and further providing a reference path to provide interferometric images.

22. The method of claim 21 and further comprising selectively controlling illumination to the reference path with a shutter.

23. The method of claim 18 and further comprising stroboscopically gating the illumination source.

24. The method of claim 23 and further comprising timing the gating with the computer.

25. The method of claim 23 and further comprising timing the gating signal with an external synchronization signal.

26. The method of claim 18 further comprising illuminating the target with at least a second illumination source with a portion of an optical path of the at least a second illumination source in common with that of the at least one illumination source.

27. The method of claim 18 wherein the computer is controlled by a user over a network.

28. The method of claim 18 further comprising using at least a first and a second coherent illumination source, the first coherent illumination source being at a different wavelength from the second coherent illumination source,
gating the first and second coherent illumination sources stroboscopically, and taking interferometric measurements using at least two wavelengths.

29. The method of claim 23 in which the illumination is Kohler illumination.

30. The method of claim 23 further comprising gating the illumination so as to obtain time lapse imagery.

31. The method of claim 18 further comprising storing the video imagery on a storage device.

32. The method of claim 18 wherein the receiving step further comprises using an optical module mounted so as to be adjustable in three translational and three rotational degrees of freedom with respect to the target.

* * * * *